(12) United States Patent
Kwon

(10) Patent No.: US 8,268,377 B2
(45) Date of Patent: Sep. 18, 2012

(54) SUGAR FREE LOW CALORIE SYRUP AND THE MANUFACTURING METHOD THEREOF

(75) Inventor: Yong Chul Kwon, Seoul (KR)

(73) Assignee: Yong Chul Kwon, Seoul (KR)

( * ) Notice: Subject to any disclaimer, the term of this patent is extended or adjusted under 35 U.S.C. 154(b) by 898 days.

(21) Appl. No.: 12/301,059

(22) PCT Filed: May 16, 2007

(86) PCT No.: PCT/KR2007/002400
§ 371 (c)(1),
(2), (4) Date: Nov. 17, 2008

(87) PCT Pub. No.: WO2007/136188
PCT Pub. Date: Nov. 29, 2007

(65) Prior Publication Data
US 2009/0110771 A1    Apr. 30, 2009

(30) Foreign Application Priority Data

May 18, 2006  (KR) .................... 10-2006-0044708

(51) Int. Cl.
*A23L 1/236* (2006.01)
(52) U.S. Cl. .......... 426/548; 426/18; 426/549; 426/573; 426/578; 426/658; 426/661
(58) Field of Classification Search .................... 426/18, 426/19, 27, 548, 549, 573, 578, 658, 661
See application file for complete search history.

(56) References Cited

U.S. PATENT DOCUMENTS

| | | | |
|---|---|---|---|
| 4,565,702 A | 1/1986 | Morley et al. | |
| 5,219,605 A | 6/1993 | Klemann et al. | |
| 5,490,997 A * | 2/1996 | Devine et al. | 426/573 |
| 6,703,056 B2 | 3/2004 | Mehansho et al. | |
| 2006/0093720 A1* | 5/2006 | Tatz | 426/548 |

FOREIGN PATENT DOCUMENTS

| | | | |
|---|---|---|---|
| JP | 2005270105 | * | 8/2005 |
| JP | 2005-270105 | | 10/2005 |
| KR | 100510239 | | 8/2005 |
| KR | 100510239 | * | 10/2005 |

OTHER PUBLICATIONS

Translation of JP 2005270105, Aug. 2005.*
Translation of KR 100510239, Oct. 2005.*

* cited by examiner

*Primary Examiner* — Leslie Wong
(74) *Attorney, Agent, or Firm* — Harness, Dickey & Pierce, P.L.C.; Anthony G. Fussner; Kisuk Lee

(57) ABSTRACT

The invention concerns sugar-free syrup of low calories and a method of producing the same, which syrup is of low calories and is a healthy substitute of sugar because it has almost no calories but contains a lot of edible fiber. To this end, the sugar-free syrup of low calories according to one aspect of the invention is characterized in that it consists of 100 parts by weight of water-soluble edible fiber, 100 to 200 parts by weight of water, 0.2 to 2 parts by weight of gum, 0.2 to 2 parts by weight of natural stabilizer and a proper amount of sweetener. Also, a method of producing the sugar-free syrup of low calories according to another aspect of the invention is characterized in that it comprises the steps of adding 100 to 200 parts by weight of water to 100 parts by weight of water-soluble, edible fiber and then dissolving the mixture at 50° C. to 80° C. while agitating it, adding 0.2 to 2 parts by weight of gum when the water-soluble fiber is fully dissolved, and then dissolving the mixture while agitating it, adding 0.2 to 2 parts by weight of natural stabilizer when the gum is fully dissolved, and dissolving the mixture while agitating it, adding a proper amount of sweetener to the mixture and dissolving the resulting mixture, and then cooling it by placing the mixture at a room temperature.

18 Claims, 1 Drawing Sheet

[FIG. 1]
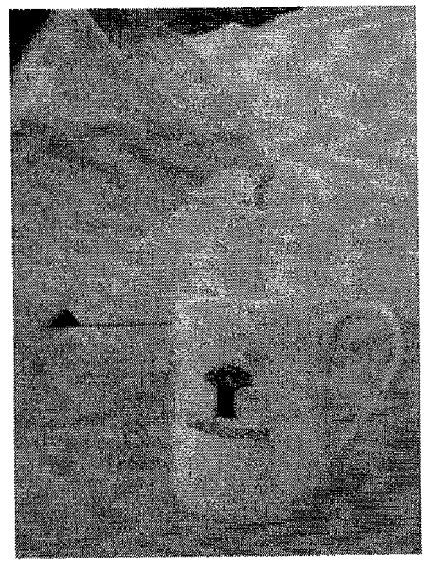
[FIG. 2]
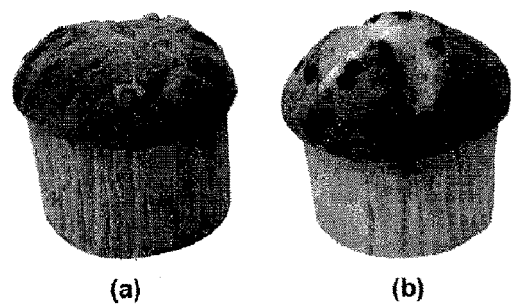
(a)  (b)
[FIG. 3]
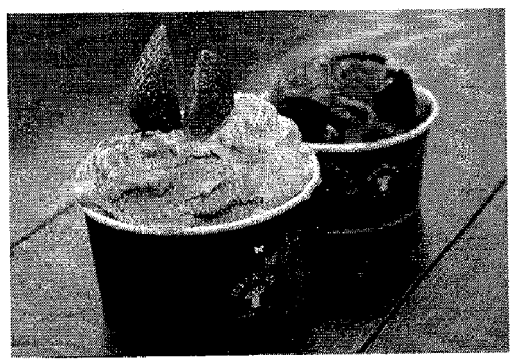

SUGAR FREE LOW CALORIE SYRUP AND THE MANUFACTURING METHOD THEREOF

CROSS REFERENCE TO RELATED APPLICATIONS

This application is a 371 of PCT International Application No. PCT/KR2007/002400 filed May 16, 2007 (Publication No. WO 2007/136188), which claims priority to Korean Application No. 10-2006-0044708 filed May 18, 2006. The disclosures of the above applications are incorporated herein by reference.

TECHNICAL FIELD

The present invention relates to sugar-free syrup of low calories and a method of producing the same, and, more particularly, to sugar-free syrup of low calories and a method of producing the same, the syrup being produced with water-soluble edible fiber and sweetener such as Aspartame, which is helpful for controlling weight, especially for preventing or treating diseases, e.g., diabetes, high blood pressure, teeth decay, constipation, etc.

BACKGROUND ART

More and more people are nowadays suffering from obesity because of lack of exercise, excessive nutrition and changes in life style. Obesity clinically causes or worsens diseases such as high blood pressure, arteriosclerosis, diabetes, fatty livers, etc.

In order to prevent and treat obesity, it is desirable to reduce taking refined saccharides such as sugar, to keep balance in nutrition and to take enough fibers. In particular, taking enough fibers results in inhibition of digestion and absorption of nutrients while giving us the feeling of a full stomach. Accordingly, we don't feel like eating too much food as a result and the fiber promotes movement of large intestines to lead to smooth evacuation, so that it helps to prevent and treat constipation.

Furthermore, syrup is thick liquid processed by mixing melt sugar with fruit juice, flavor and the like, and used in producing food such as soft drinks, ice cream, etc., and sometimes used as a substitute of honey.

Syrup is disadvantageously not only highly caloric sweetener, and contributes to obesity or to raising blood-glucose levels, but may also cause both constipation and teeth decay, etc. Patients who are suffering from obesity, diabetes, high blood pressure and the like should thus be very careful when they take food containing sugar as mentioned above.

While studying to develop low caloric sweetener for soft drinks or ice cream which people of excessive nutrition can have without worry about taking sugar, the inventor could develop syrup which has similar taste to the conventional saccharic syrup but has almost no calories and contains a lot of edible fibers, and thus conceived the subject of the invention.

DISCLOSURE OF INVENTION

Technical Problem

It is thus an object of the present invention to provide healthy syrup that has almost no calories but contains a lot of edible fibers to be good for keeping our body healthy.

Also, it is another object of the invention to provide bread of low calories and ice cream having a low content of carbon hydrate and also having a high content of edible fibers required for our body, but giving taste and feeling in our mouth, not different from prior art products, by using the inventive syrup instead of sugar.

Technical Solution

In order to achieve the aforementioned objects of the invention, the invention is characterized in that the sugar-free syrup of low calories according to an aspect of the invention comprises 100 parts by weight of water-soluble edible fiber, 100 to 200 parts by weight of water, 0.2 to 2 parts by weight of gum, 0.2 to 2 parts by weight of natural stabilizer and a proper amount of sweetener.

Also, the invention is characterized in that the method of producing the sugar-free syrup of low calories according to another aspect of the invention comprises the steps of adding 100 to 200 parts by weight of water to 100 parts by weight of water-soluble edible fiber and then dissolving the mixture at 50° C. to 80° C. while agitating it, adding 0.2 to 2 parts by weight of gum when the water-soluble fiber is fully dissolved, and then dissolving the mixture while agitating it, adding 0.2 to 2 parts by weight of natural stabilizer when the gum is fully dissolved and then dissolving the mixture while agitating it, adding a proper amount of sweetener to the resulting mixture and dissolving the mixture, and then cooling it by placing the mixture at a room temperature.

Now, the method of producing sugar-free syrup of low calories according to the invention will be described with a process of producing the syrup.

<Producing Sugar-Free Syrup of Low Calories>

(1) Dissolving water-soluble edible fiber

The water-soluble edible fiber is dissolved in water. There are many kinds of available water-soluble edible fiber, but the fiber used in the invention must be fully hydrophilic. Large particles such as gum are not suitable because the resulting syrup would taste thick and chalky as its viscosity increases.

First, the water-soluble edible fiber is crushed into fine particles with a homogenizer of rotor type. In this case, it is preferred to set RPM of the homogenizer to more than 10,000. The higher the value of RPM is, the finer the fiber is crushed, leading to easier dissolution thereof.

After adding 100 to 200 parts by weight of water to 100 parts by weight of water-soluble edible fiber particles, the resulting mixture is agitated to dissolve the fiber at 50° C. to 80° C.

The amount of added water must be one or more times the weight of water-soluble edible fiber, so that it is easy to dissolve the water-soluble edible fiber and the amount is effective to reduce calories.

It is, however, hard to keep the viscosity specific to typical syrup if the amount is more than two times. Proper dissolution temperature is 50° C. to 80° C. The higher the temperature is, the higher the speed of dissolution is, but the water-soluble edible fiber may burn if the temperature is above 80° C. Therefore, it is required to be very careful to keep the temperature in the range specified above.

In order to raise the dissolving temperature and prevent the water-soluble edible fiber from being scorched, it is desirable to dissolve the mixture while agitating it. A proper time for agitating the mixture is 12 to 18 hours. If the time is too short, the water-soluble edible fiber is not fully dissolved to thus produce sediments. If the time is too long, bubbles may be created to cause overflow.

(2) Adding gum

This is the step for adding and dissolving gum after the water-soluble edible fiber is fully dissolved in water in order to make the syrup be viscous.

Exemplary gum used in the invention is any one selected from the group of edible gums consisting of Gellan Gum, Arabic Gum, Xantan Gum, Gua Gum, Locust Gum, etc., or mixtures thereof.

First, the gum selected is crushed to fine particles with the aforementioned homogeniger. In this case, it is desirable to set RPM of the homogeniger to more than 10,000 as the same when the water-soluble edible fiber was crushed to fine particles. The higher the RPM is, the smaller the size of gum particles is, in turn leading to easier dissolution thereof.

After adding 0.2 to 2 parts by weight of gum particles to the water-soluble edible fiber solution, the mixture is dissolved while agitating it. The amount of added gum can be decided depending on the type of gum and a desired viscosity of the resulting syrup. Also, if too much gum is added, the resulting syrup tastes thick and heavy, and it is thus required to be very careful when deciding the amount of the added gum.

(3) Adding natural stabilizer

This is the step that, after the gum is fully dissolved, natural stabilizer is added and dissolved, in order to homogenize the resulting syrup.

The stabilizer serves to homogenize the resulting syrup by preventing main components of water, edible fiber, gum, etc., from being separated floating or producing sediments.

The invention is characterized in that the stabilizer used in the invention is nano-starch or nano-modified starch. In particular, nano-modified starch serves to homogenize the resulting syrup, to give glutinous feeling in our mouth and also to significantly improve the appearance of a final product with the inventive syrup, as well.

After adding 0.2 to 2 parts by weight of natural stabilizer to the water solution containing dissolved water-soluble edible fiber and gum, the resulting mixture is then mixed well while agitating it. A proper amount of time for agitating it is 1 to 2 hours.

(4) Adding sweetener

When the natural stabilizer is fully dissolved, artificial sweetener such as Aspartame or Acelsulfame-K, etc., or natural sweetener such as sorbitol, xylitol, isomalt, etc. can be added to give sweet taste.

The sugar-free syrup of low calories produced according to the invention as described above can be used instead of sugar when making food, i.e., muffins, ice cream, soft drinks, coffee, etc. Hereinafter, the method of making muffins and ice cream with the sugar-free syrup of low calories produced as described above according to the invention will be described in detail. It should be noted that, when a particular description for a known method of making the aforementioned food is considered to make the subject of the invention obscure, it will be not be described in more detail.

<Making Bread of Low Calories and a Low Content of Carbon Hydrate>

(1) Mixing material

This is the step of adding a proper amount of yeast to the main material of flour, edible fiber and protein, and then kneading the resulting mixture with water.

In this case, the amount of flour content is decided to be a value to minimize the content of carbon hydrate while keeping the normal texture and taste of produced bread, the value being 40 to 90 weight % relative to the weight of the main material, and the amount of edible fiber and protein content is 5 to 55 weight %, respectively, relative to the weight of the main material.

It is preferable to add the edible fiber in a form of sugar-free syrup of low calories according to the invention. The sugar-free syrup of low calories according to the invention is very useful to improve the texture of bread, and doesn't make any difference from typical bread in taste or texture although the amount of carbon hydrate is reduced.

There is no restriction for the protein used in the invention, which can be bean protein, whey protein, gluten, eggs, etc., provided that it can provide general protein.

The amount of used flour is smaller than that for ordinary bread, and the reduced amount of carbon hydrate is replaced by the edible fiber having almost no calories and protein useful for keeping our body healthy. Therefore, it is possible to make functional bread that has lower calories but is nutritious according to the invention.

(2) First fermentation

This is the step of mixing, kneading the aforementioned material, and then primarily fermenting the dough at 35±5° C. for about 24 to 30 hours. After first fermentation, the dough swells about two times the volume of the original dough before first fermentation.

(3) Second fermentation

Cellulase is added to the dough which underwent first fermentation and kneaded well. The dough is then cut into pieces of a proper size and undergoes second fermentation at 35±5° C. for about 40 to 50 minutes.

The bread of low calories and a low content of carbon hydrate contains a small amount of carbon hydrate but a lot of edible fiber. Therefore, we may feel the bread to be tough in our mouth. If cellulase is added to the dough that underwent first fermentation in order to overcome the disadvantage, the cellulase divides fiber into very small pieces, so that the bread made with the dough give softer feeling.

The amount of added cellulase is based on the amount specified in the manufacturer's user guide, but can vary of course to be proper for producing bread with desired feeling in our mouth.

If desired, nuts, choco-chips, green tea powder, etc. can be further added.

(4) Baking bread

This is the step of baking the bread made with the dough which underwent second fermentation, in an oven.

<Producing Sugar-Free Ice Cream of Low Calories>

(1) Mixing water with dry milk

This is the step of agitating dry milk in water that is together called main material in order to mix it well until no lump in the mixture.

It is typical to use milk that contains enough fat to produce nice taste and to make soft texture, but it is preferred to use non-fat milk containing no fat, in order to produce light taste.

If more water is used, the unit production cost is lowered, which in turn results in lighter taste. Therefore, the amount of water should be decided, considering the intended concentration and taste of ice cream. A recommendation by inventor's experience for a long time is 30 to 60 parts by weight of milk relative to 100 parts by weight of water.

If required, it is possible to further add a proper amount of edible fiber, protein, vitamin, etc., in order to improve the functionality of the produced ice cream.

(2) Adding syrup

This is the step of adding sugar-free syrup of low calories according to the invention to the mixture of water and dry milk, and then mixing the resulting mixture well. A proper amount of added syrup is 15 to 50 parts by weight.

(3) Adding modified starch

This is the step of adding modified starch to the mixture of water, dry milk and syrup in order to homogenize the mixture and to give glutinous feeling in our mouth which is proper to gelato ice cream. More preferably, the modified starch is nano-modified.

A proper amount of the modified starch is 0.5 to 5 parts by weight, but those skilled in the art will appreciate that the proper amount thereof can vary depending on the amount of added water, the concentration and amount of syrup, and the level of desired glutinousness.

(4) Adding sweetener

If desired, it is possible to add sweet taste without increasing calories by adding artificial sweetener such as Aspartame, Acesulfame-K, etc. The sweetener can be added during any process described above. If desired, nuts, choco-chips, fresh fruits such as chopped strawberries, bananas, etc. can be added or flavor such as vanilla, etc., can also be added.

(5) Freezing

This is the step of freezing the resulting mixed material for the ice cream according to the invention while agitating it, in an icemaker.

BRIEF DESCRIPTION OF THE DRAWINGS

These and other features, aspects, and advantages of the present invention will become apparent through the following description, illustrated in the appended drawings. In the drawings:

FIG. 1 shows a photograph of pouring sugar-free syrup of low calories produced according to the invention into a cup;

FIG. 2 shows photographs of two muffins produced with the sugar-free syrup of low calorie according to the invention and having low calories and a low content of carbohydrate, in which (a) shows a walnut muffin and (b) shows a choco-chip muffin, the muffins being intended to represent bread made according to the invention; and FIG. 3 shows a photograph of sugar-free ice cream of low calories produced with the sugar-free syrup of low calories according to the invention.

BEST MODE FOR CARRYING OUT THE INVENTION

Hereinafter, preferred embodiments of the present invention will be described in detail with reference to the accompanying drawings. However, it should be apparent to those skilled in the art that the following embodiments are intended only to illustrate the invention in more detail but not to limit the scope of the invention. That is, it should be noted that mere variations and modifications of the invention can readily be embodied by those skilled in the art, and the variations and modifications should be covered by the subject of the invention as claimed in the claims.

Embodiment 1

<Producing Sugar-Free Syrup of Low Calories>

First, the edible fiber powder of chicory available in the market (produced by KOSHER PRODUCT Co., Belgium) was put in a homogenizer (available from Gyoungseong Machinery Co.). The powder was homogenized in the machine at 10,000 RPM for 10 hours to crush it into homogeneous particles. To 100 g of the crushed edible fiber particles, 100 g of purified water was added. While keeping the temperature at 50° C., the resulting mixture was mixed for 13 hours with a mixer (available from IKA Co.) to fully dissolve the edible fiber power in the purified water.

To the solution of edible fiber in water dissolved as such, 1 g of xanthan gum crushed to particles (available from CREMAR Co.) was added. Subsequently the mixture was mixed at 50° C. for one hour to fully dissolve the gum in the solution of edible fiber in water. The xanthan gum used here was homogeneously crushed in the same way for the edible fiber crushed to homogeneous particles.

Then, to the solution in water where the water-soluble edible fiber and the gum was dissolved, 1 g of nano-modified starch was added, and the mixture was then agitated and mixed well for one hour.

Subsequently, after adding 0.1 g of Aspartame, the resultant mixture was agitated and mixed well for one hour to produce sugar-free syrup of low calories according to the invention (shown in FIG. 1).

Embodiment 2

<Producing Bread of Low Calories and a Low Content of Carbon Hydrate>

First, dough was made by mixing 8 kg of flour (soft-wheat powder), 3 kg of the syrup produced in the embodiment 1, with 0.5 kg of bean protein (available from SANOVO FOODS A/S) and 0.1 kg of yeast and adding 2.5 l of purified water to the resultant mixture, was kneaded and then underwent first fermentation at 35° C. for 24 hours.

To the dough which underwent first fermentation, added was 100 ml of cellulase (Viscozyme L, available from NOVOZYMES Co.). The dough was subsequently kneaded fully, to which dough suitable nuts or choco-chips for bread were added. The mixture was then kneaded and mixed well for secondarily fermenting the mixture at 35° C. for 40 minutes.

The dough underwent second fermentation as such, and was baked for 15 minutes in an oven at 205° C. to make bread of low calories and a low content of carbon hydrate (shown in FIG. 2).

Embodiment 3

<Producing Sugar-Free Ice Cream of Low Calories>

First, 400 g of non-fat dry milk and 1 l of purified water was put in a mixer (available from Doctor Robin Co.) and mixed well. Subsequently, 200 ml of the sugar-free syrup of low calories produced in the embodiment 1 was added to the mixture and the resulting mixture was then mixed well again. To the resulting mixture, 10 g of nano-modified starch was added and the mixture was mixed well again. To the basic material mixed and produced as described above, added and mixed was green tea powder, fresh fruits such as chopped strawberries or bananas and the like or cocoa powder, nuts, etc. The resulting mixture was put and agitated in an icemaker (available from Doctor Robin Co.) and finally frozen to produce sugar-free ice cream of low calories (shown in FIG. 3).

Experiment Example

<Testing Functions>

The syrup, bread and ice cream produced according to the embodiments were tested by 100 people randomly selected for testing functions thereof after sampling the products produced according to the invention. Their opinions for taste, feeling in their mouth and a general level of liking of the samples were thereafter questioned with questionnaires. The result is shown in the following Table 1.

TABLE 1

Result of testing functions

| Category | Taste | Feeling in mouth | Appearance | General level of liking |
|---|---|---|---|---|
| Embodiment 1 (syrup) | 5.0 | 7.0 | 7.0 | 8.0 |
| Embodiment 2 (bread) | 6.0 | 7.5 | 7.5 | 8.2 |
| Embodiment 3 (ice cream) | 6.3 | 7.3 | 7.5 | 8.5 |

Evaluation: very good(10 points), good (7.5 points), normal(5 points), bad(2.5 points), very bad(0)

As seen from the result of the above test, the bread and ice cream produced with sugar-free syrup of low calories according to the invention overall showed a high level of liking. In particular, people who participated in the test showed much interest in the products according to the invention because the products had similar taste, feeling in their mouth and appearance as compared to prior art products, but had even lower calories and contained a lot of fiber. It is considered that quite higher evaluation points for overall liking than respective evaluation points for taste, feeling in their mouth and appearance may reflect such interest.

INDUSTRIAL APPLICABILITY

As described above, the sugar-free syrup of low calories does not contain sugar at all which is known to cause diseases such as obesity, diabetes, teeth decay, etc., while it contains a lot of fiber, which is very good for keeping our body healthy.

The sugar-free syrup of low calories according to the invention can be used instead of sugar for producing soft drinks, ice cream, etc., so that it is very useful for producing healthy food of low calories which many people like without worrying about taking refined sugar.

The healthy bread of low calories and a low content of carbon hydrate produced with the sugar-free syrup of low calories according to the invention are low caloric and healthy food while containing a lot of edible fiber.

Also, the healthy bread of low calories and a low content of carbon hydrate produced with the sugar-free syrup of low calories according to the invention has an advantage that the bread is functional while having no difference from existing bread in taste and feeling in our mouth.

Also, since the sugar-free ice cream of low calories produced with the sugar-free syrup of low calories according to the invention contains a lot of edible fiber, people who suffer from obesity or intend to control their weight can enjoy the ice cream without any worry for taking sugar.

Also, it is an advantage that the sugar-free ice cream of low calories produced with the sugar-free syrup of low calories according to the invention is functional ice cream while having similar taste and texture to the conventional ice cream.

The present invention has been described in detail. However, it should be understood that the detailed description and specific examples are given by way of illustration only, while indicating preferred embodiments of the invention, since various changes and modifications within the spirit and scope of the invention will become apparent to and be made by those skilled in the art from this detailed description.

In the claims, use of the verb "comprise" and its conjugations does not exclude the presence of elements or steps other than those stated in a claim. The article "a" or "an" preceding an element does not exclude the presence of a plurality of such elements.

The invention claimed is:

1. A sugar-free syrup of low calories, comprising:
   100 parts by weight of water-soluble edible fiber,
   100 to 200 parts by weight of water,
   0.2 to 2 parts by weight of gum selected from the group consisting of gellan gum, Arabic gum, xanthan gum, guar gum, locust gum, and mixtures thereof,
   0.2 to 2 parts by weight of a natural stabilizer which is nano-starch or nano-modified starch and
   a sweetener.

2. The sugar-free syrup as claimed in claim 1, wherein the natural stabilizer is nano-modified starch.

3. A method of producing a sugar-free syrup of low calories, comprising:
   adding 100 to 200 parts by weight of water to 100 parts by weight of water-soluble edible fiber and agitating the mixture at 50° C. to 80° C.;
   adding 0.2 to 2 parts by weight of gum selected from the group consisting of gellan gum, Arabic gum, xanthan gum, guar gum, locust gum, and mixtures thereof when the water-soluble fiber is fully dissolved, and agitating the mixture;
   adding 0.2 to 2 parts by weight of a natural stabilizer which is nano-starch or nano-modified starch when the gum is fully dissolved, and agitating the mixture; and
   adding a sweetener to the resulting mixture and dissolving the mixture, and then cooling it by placing the mixture at room temperature.

4. The method as claimed in claim 3, further comprising crushing the edible fiber and the gum to fine particles with a homogenizer.

5. The method as claimed in claim 3, wherein the natural stabilizer is nano-modified starch.

6. Bread of low calories and a low content of carbohydrate, comprising the sugar-free syrup of claim 1.

7. The bread of claim 6, which comprises:
   40 to 90 weight % of flour,
   5 to 55 weight % of edible fiber and
   5 to 55 weight % of protein.

8. A method of producing bread of low calories and a low content of carbohydrate, comprising the steps of:
   adding yeast to a main material consisting of flour, edible fiber and protein, wherein the material contains 40 to 90 weight % of flour, 5 to 55 weight % of the edible fiber and 5 to 55 weight % of protein, and the edible fiber is provided as a form of the sugar-free syrup of claim 1, mixing the main material with water and kneading the resulting mixture;
   primarily fermenting the resulting mixture at 35±5° C. for 24 to 30 hours after kneading;
   adding cellulase to the resulting mixture, cutting the mixture into pieces of a proper size after kneading, and secondarily fermenting the pieces at 35±5° C. for 40 to 50 minutes; and
   baking the pieces after second fermentation.

9. Sugar-free ice cream of low calorie, comprising the sugar-free syrup of claim 1.

10. The sugar-free ice cream of low calories as claimed in claim 9 comprising:
    100 parts by weight of water,
    30 to 60 parts by weight of dry milk powder,
    15 to 50 parts by weight of the sugar-free syrup of claims 1, and
    0.5 to 5 parts by weight of modified starch.

11. A method of producing sugar-free ice cream of low calories comprising the steps of:
   mixing 100 parts by weight of water and 30 to 60 parts by weight of dry milk powder until there is no lump in the mixture;
   adding, to the mixture of water and dry milk powder, 15 to 50 parts by weight of the sugar-free syrup of claim 1, mixing the resulting mixture;
   adding 0.5 to 5 parts by weight of modified starch to the mixture of water, dry milk powder and syrup, mixing the resulting mixture; and
   freezing the mixture of water, dry milk powder, syrup and modified starch, while agitating the mixture.

12. The sugar-free syrup as claimed in claim 1, wherein the water-soluble edible fiber is from chicory.

13. The sugar-free syrup as claimed in claim 1, wherein the gum is xanthan gum.

14. The method as claimed in claim 3, wherein the water-soluble edible fiber is from chicory.

15. The method as claimed in claim 3, wherein the gum is xanthan gum.

16. The method as claimed in claim 3, wherein the natural stabilizer is nano-modified starch.

17. The bread of low calories and a low content of carbohydrate as claimed in claim 6, wherein the sugar-free syrup is prepared by the method of claim 3.

18. The sugar-free ice cream of low calorie as claimed in claim 9, wherein the sugar-free syrup is prepared by the method of claim 3.

* * * * *